Patented Aug. 8, 1944

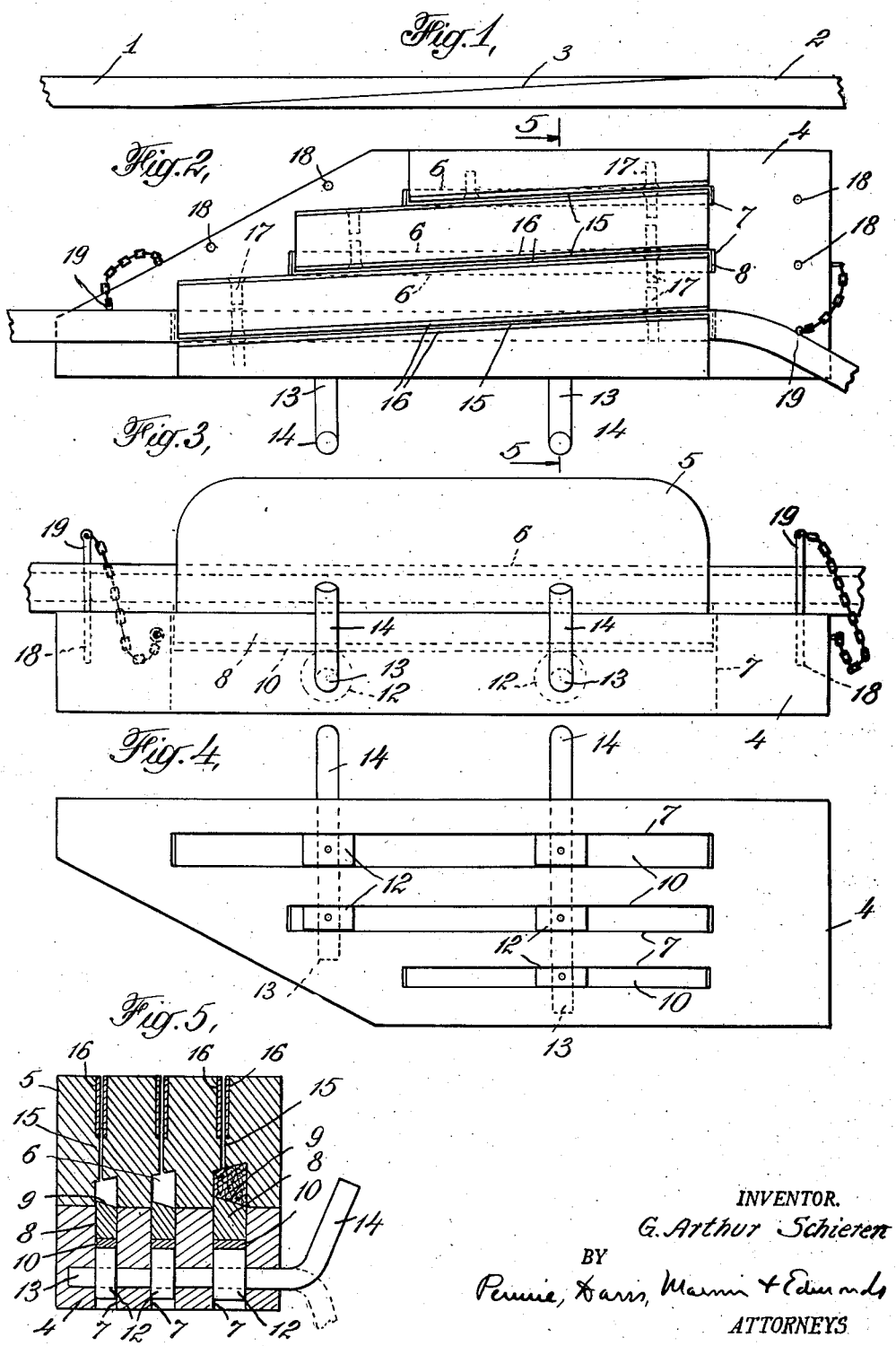

2,355,112

UNITED STATES PATENT OFFICE 2,355,112

BELT SPLICING MECHANISM

George Arthur Schieren, Great Neck, N. Y., assignor to Chas. A. Schieren Company, New York, N. Y., a corporation of New York Application June 17, 1943, Serial No. 491,124

4 Claims. (Cl. 69—20)

This invention relates to apparatus for cutting leather V-belts to prepare the ends of such belts for splicing.

When two pieces of V belt are to be joined, or when the two ends of a piece of V belt are to be joined to each other to form an endless belt, it is the usual practice to form a relatively long inclined end or bevel extending from the top to the bottom of the belt, and to cement two ends having similar bevels to each other. The complementary ends to be thus secured must conform to each other, that is, the inclined or bevelled ends should fit together to form a spliced section of the same cross-section as the rest of the belt.

The present invention provides apparatus for conforming the inclined or bevelled ends of sections of V-belt for splicing to similar ends of other sections of V belt. The invention comprises a block having one or more openings shaped to conform to the belt and in which one of the walls of the opening is made movable to clamp the belt in place. Above the opening the block is provided with a slot running from one end to the other and at an angle to the axis of the opening. The upper portion of this slot is provided with guide plates at each side spaced from each other a distance equal to the thickness of the saw used in cutting the belt.

When the belt is properly clamped in the opening, a saw is inserted in the slot and the belt cut to form the inclined or bevelled ends. This results in the production of inclined end portions that are uniform in the length and angle of the cut. When two such ends are cemented to each other, the joined portions of the spliced belt are of the same width and thickness as the other sections of the belt. The spliced belt so produced is superior to those obtained by present known methods of forming the inclined or bevelled ends for splicing.

In the accompanying drawing, I have shown one embodiment of the invention. In this showing:

Fig. 1 is an illustration of a spliced belt formed by cementing two inclined end sections to each other;

Fig. 2 is a top plan view of the belt cutting mechanism;

Fig. 3 is a side elevation;

Fig. 4 is a bottom plan view; and

Fig. 5 is a transverse, vertical sectional view on line 5—5 of Fig. 2.

Referring to the drawing, the reference numerals 1 and 2 represent two sections of leather V belt spliced to each other along the line 3 formed by bevelling or inclining one end section from the bottom to the top and the other end section reversely from the top to the bottom. To produce a satisfactory spliced belt, it is desirable that the bevelled ends 3 conform to each other in length and angle.

In the apparatus for producing such bevelled ends, I provide a base 4 on which is mounted a belt holding member 5. The belt holding member is provided with one or more openings 6 extending from end to end and shaped corresponding to the cross-section of a V belt. As shown in Fig. 5, these openings are of varying size to accommodate V belts of varying size. The bottom of each of the openings 6 is movable to permit the belt to be clamped in place. As shown, the base is provided with slots 7 of the same width as the openings 6 and each of these slots receives a block or follower 8, the upper edge 9 of which is at an angle to correspond to the angle of the side of the V belt. I preferably employ a wear plate 10 of metal under each of the followers 8 and these wear plates are engaged by cams 12 mounted on shafts or pins 13 extending transversely of the base 4. One end of each of the shafts 13 is extended at an angle to form a handle 14. In the form of the invention illustrated, I have employed two such shafts provided with cams to clamp the belt in the opening 6.

In the portion of member 5 above the openings 6, I provide slots 15 to receive a saw for cutting a belt arranged in the opening 6. As shown (see Fig. 2) each of the slots 15 extends from end to end of number 5 and is arranged at an angle to the longitudinal axis of the belt. The slot starts at one side of the opening 6 and terminates at the opposite side so that the belt will be cut at an incline corresponding to the inclined end 3. The upper portion of each of the slots 15 is provided with guide plates 16 (see Fig. 5) and these guide plates are spaced from each other a distance equal to the thickness of the saw. The guide plates may be secured in member 5 by any suitable means such as by screws 17. The base member is provided with a series of openings 18 adjacent each end and substantially in alignment with the openings 6. These openings are adapted to receive removable pins 19.

In operation, a belt to be cut for splicing is threaded through one of the openings 6, the opening of the proper size for the particular belt being chosen. A belt in position in the larger of the 3 openings is illustrated in Figs. 2 and 5. It will be noted that the openings are so shaped that the belt is arranged with the bottom at one side and the top at the other side of the opening. The openings 18 are so positioned that after the belt has been threaded through the holder, the pins 19 inserted in these openings hold the bottom of the V belt securely against one sidewall of the opening 6. The saw is then inserted in the slot 15. The spacing between the guide plates 16 and the slot below the guide plates is substantially equal to the thickness of the saw so that the saw is properly guided and with the belt clamped in position and held against one wall of the opening 6, a true cut is obtained in all instances, producing bevelled ends conforming to each other in angle and length.

I claim:

1. Apparatus of the character described comprising a member having an opening therein, a plurality of the walls of the opening being spaced from each other and arranged at angles to each other substantially equal to the spacing and angles of a plurality of the faces of a belt to be received therein and adapted to contact with a plurality of the faces of the belt, an adjustable member arranged in the opening and adapted to engage another face of the belt in the opening to clamp the belt in the opening, and a slot extending from the exterior of the member to the opening, the slot being arranged at an angle to the longitudinal axis of the opening.

2. Apparatus of the character described comprising a member having an opening therein, a plurality of the walls of the opening being spaced from each other and arranged at angles to each other substantially equal to the spacing and angles of a plurality of the faces of a belt to be received therein and adapted to contact with a plurality of the faces of the belt, an adjustable member arranged in the opening and adapted to engage another face of the belt in the opening to clamp the belt in the opening, and a slot extending from the exterior of the member to the opening, the slot extending the full length of the opening and being arranged at an angle to the longitudinal axis of the opening.

3. Apparatus of the character described comprising a member having a longitudinal opening therein, a plurality of the walls of the opening being spaced from each other and arranged at angles to each other substantially equal to the spacing and angles of a plurality of the faces of a belt to be received therein and adapted to contact with a plurality of the faces of the belt, an adjustable member arranged in the opening and adapted to engage another face of the belt in the opening to clamp the belt in the opening, cams arranged adjacent said member to permit adjustment thereof, and a slot extending from the exterior of the member to the opening, the slot extending the full length of the opening and being arranged at an angle to the longitudinal axis of the opening.

4. Apparatus of the character described comprising a member having a longitudinal opening therein, a plurality of the walls of the opening being spaced from each other and arranged at angles to each other substantially equal to the spacing and angles of a plurality of the faces of a belt to be received therein and adapted to contact with a plurality of the faces of the belt, an adjustable member arranged in the opening and adapted to engage another face of the belt in the opening to clamp the belt in the opening, cams engaging the adjustable member, a slot extending from the exterior of the member to the opening, the slot extending from one end of the opening to the other and extending across the opening from one side to the other at an angle to the axis of the opening, and a pair of guide plates arranged in the slot and spaced from each other substantially the width of a saw to be received in the slot.

GEORGE ARTHUR SCHIEREN.